Patented Jan. 31, 1928.

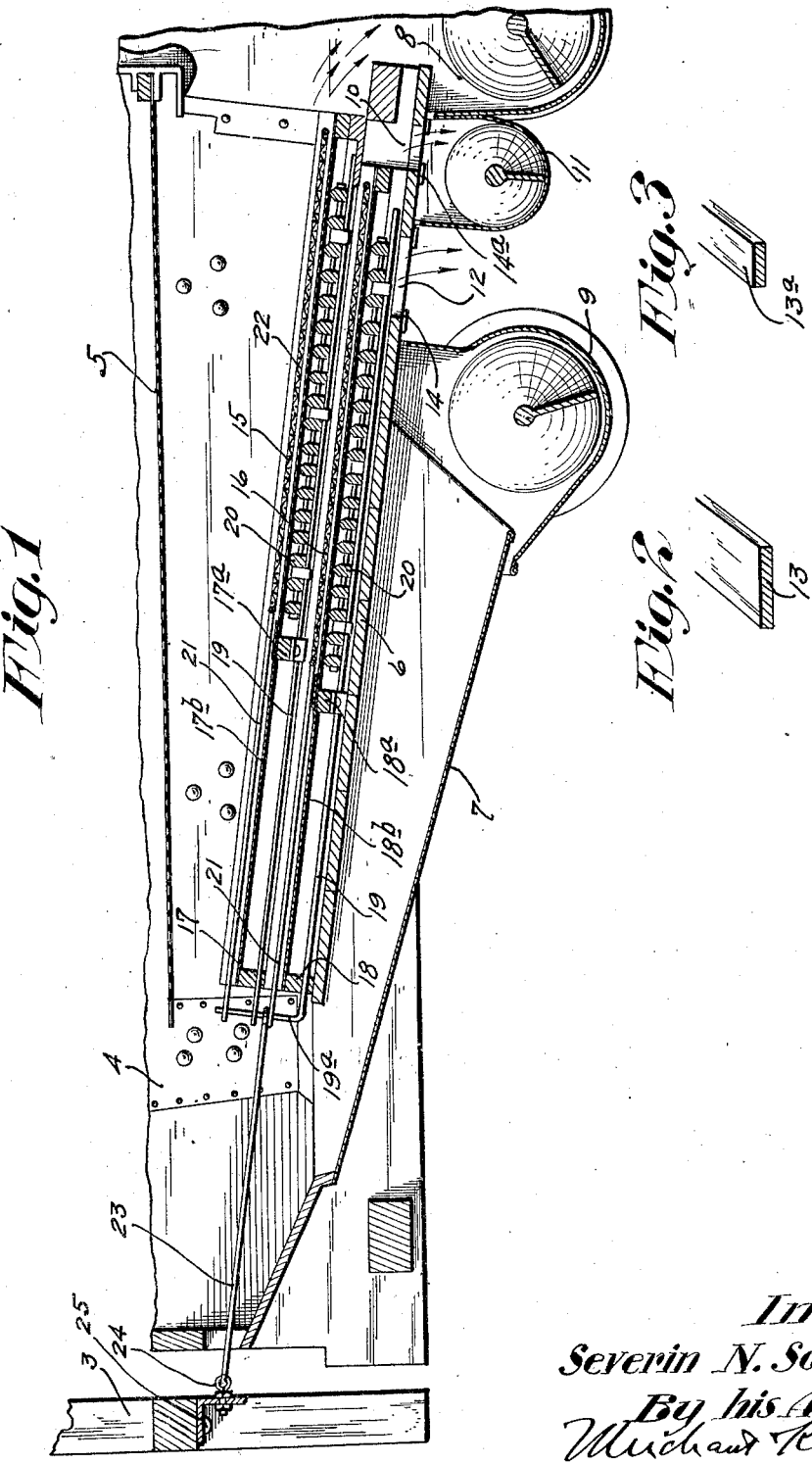

1,657,646

UNITED STATES PATENT OFFICE.

SEVERIN N. SORENSEN, OF ST. PAUL, MINNESOTA.

RECLEANING SIEVE.

Application filed April 25, 1925. Serial No. 25,796.

My invention provides an improvement in recleaning sieves or sieves adapted to be used as dockage screens, and, generally stated, the invention consists of the novel devices and combinations of devices hereinafter described and defined in the claims.

The improved sieve structure is especially designed for use in connection with threshing machines, but is capable of more general use. Generally stated, the invention consists of the novel devices and combinations of devices hereinafter described and defined in the claims.

In some respects, this invention is in the nature of a modification of or improvement on the sieve structure disclosed and claimed in the application of Harry L. Johnson, Serial No. 13,715, filed March 7, 1925, and entitled "Recleaning sieve."

In the accompanying drawings, which illustrate the invention, like characters indicate like parts throughout the several views.

Referring to the drawings:

Fig. 1 is a longitudinal section, with some parts broken away, showing the improved sieve structure applied to the sieve shoe of the threshing machine;

Fig. 2 is a fragmentary perspective showing a board adapted to be used as a gate to close the discharge passage in the bottom of the sieve shoe; and Fig. 3 is a fragmentary perspective of a gate-acting board.

Fig. 1 shows certain parts of a standard threshing machine and which parts may be briefly noted as follows: The housing or main frame 3, and the vibratory sieve shoe 4, which latter is provided with an upper scalping screen 5, an inclined bottom deck 6, and an underlying inclined spout or deck 7. The lower end of the deck 6, as shown, delivers to a transverse auger-equipped trough 8; the lower deck 7 delivers to a transverse auger-equipped trough 9; and the deck 6, near its lower end, is provided with a transverse discharge passage 10, which, as shown, delivers to a transverse auger-equipped trough 11. Between the troughs 9 and 11, the bottom deck 6 is provided with a transverse discharge passage 12, which, under certain conditions, is adapted to be closed by a gate-acting board 13 securable in position by suitable devices, such as turn-buttons or clips 14 applied to the underside of said bottom deck 6. Ordinarily, however, the discharge passage 12 will be open.

Fig. 3 shows a gate-acting board that is adapted to be slid into position to close the discharge passage 10 and to be there held by any suitable means, such as turn-buttons or clips 14$^a$ applied to the under surface of the bottom deck 6.

Mounted on or close to the bottom deck 6 of the vibratory sieve shoe 4 are two forwardly inclined recleaning sieves or dockage screens 15 and 16 secured, respectively, to rectangular marginal frames 17 and 18. Said frames 17 and 18 are shown as provided with intermediate transverse bars 17$^a$ and 18$^a$ and the screens 15 and 16 are extended below said bars. Said frames 17 and 18, above their bars 17$^a$ and 18$^a$, respectively, are covered by inclined imperforate decks 17$^b$ and 18$^b$.

The lower screen 16 is of finer mesh than the upper screen 15. Said screen 15 is of such mesh that it will not pass therethrough good wheat and good oats, but will pass therethrough all smaller seeds, grain or particles. The relative size of the meshes of said screens will be considered in the description of the operation.

For each of the sieves 15 and 16 there is provided an upper and a lower sieve-cleaning device. Each lower cleaning device comprises longitudinal bars 19 and transverse slats 20. The bars 19 slide through the upper cross bars of the respective frames 17 and 18 and intermediate bars 17$^a$ and 18$^a$ and the upper edges of the slats 20 scrape the under surfaces of the respective sieves 15 and 16. Each upper cleaning device, as shown, comprises longitudinal bars 21 and a woven wire fabric 22, which latter works frictionally on the upper surface of the respective screens 15 and 16. The lower bars 19 have upturned ends 19$^a$ that are extended through perforations in the overlying bars 19 and 21. The sieve-cleaning devices are anchored against longitudinal movements by one or more anchoring bars 23. As shown, the front end of the anchoring bar 23 has an eye through which the upturned end 19$^a$ of the lower bar 19 is passed. At its rear end, the anchor bar 23 is anchored to the frame 3, being, as shown, directly connected by an eye-bolt 24 to an angle bar 25, which, in turn, is rigidly secured to the fixed frame 3. With this arrangement, as is evident, when the sieve-equipped shoe is vibrated, the sieve-cleaning devices will be caused to scrape both the upper and under surfaces of the screens 15 and 16. Of course, the said screens 15 and 16 may be more extended longitudinally than illustrated in the drawings.

*Operation.*

When the discharge passages 10 and 12 are open, as shown in Fig. 1, the operation of the sieve structure and cooperating parts will be as follows:

The straw and chaff will, of course, be carried off by the scalping screen 5 and, by the deck 7, will be delivered to the spout 9. The good wheat and oats will be discharged off from the lower end of the upper recleaning sieve 15 and into the trough 8. All finer or smaller grain, seeds or materials will pass through the sieve 15 and onto the lower sieve 16. All materials that will pass through the sieve 15 are herein treated as dockage, but the dockage may and usually will consist of different grades or kinds of seeds. The meshes of the sieve 16 are such that what may be treated as large or high grade dockage, such as buckwheat, crack or shriveled wheat, will pass over and off from the lower end of the sieve 16 and from thence through the passage 10 into the trough 11, while the small seeds or low grade dockage, such as mustard, French weed, pigeon grass, and some flax seed, will pass through the perforations of the lower sieve 16 and from thence out through the discharge passage 12.

It, therefore, appears that with the device adjusted for operation as shown in Fig. 1, there will be effected three complete separations, towit: good wheat and oats, usually designated as "succotash", from the other and finer particles; high grade or large dockage from the finer dockage; and finer or low grade dockage from the high grade dockage. This is an ideal separation for most purposes, for the high grade dockage makes excellent chicken feed, for example. In the operation of the threshing machine, however, such separation is not always desired and various other separations may, from time to time, be desirable, at least temporarily. This I make possible without removing or in any way tampering with the recleaning sieves or cleaning devices. For example, if the gate board 13 be applied to close the passage 12, while the passage 10 is still open, then the small dockage will be recommingled with the large dockage. If the gate board 13ª be applied to close the passage 10, while the passage 12 is open, then the large dockage will be recommingled with the succotash or good grain. If, however, the gate board 13 be applied to close the passage 10 and the gate board 13ª be applied to close the passage 12, then both the small and coarse dockage will be recommingled with the succotash or good grain. This arrangement, therefore, provides for all of the various different operations that may, from time to time, be required and all without the removal or changing of the sieve structure.

It is important to note that the lower sieve is shorter than the upper sieve, that is, at its discharge end terminates back of the discharge end of the upper sieve so that the said lower sieve may deliver the large dockage directly through the discharge passage 10. This makes possible the use of a constantly open discharge passage 10 in which no gate whatever will be required unless an arrangement should be desired wherein both the large and small dockage can be recommingled with the good stock.

What I claim is:

1. The combination with the vibratory sieve shoe of a threshing machine, of upper and lower screens carried by said shoe, the upper screen having meshes that pass therethrough both fine and coarse dockage and the lower screen having meshes that pass therethrough only fine dockage, said shoe having an inclined bottom deck provided with two discharge passages, one rearward of the delivery end of said upper screen but forward of the delivery end of the lower screen and the other discharge passage being nearer but rearward of the delivery end of said lower screen, and gate-acting devices applicable at will to close either or both of said discharge passages, whereby, when both of said discharge passages are open, large and small dockage will be separated from the good grain and from each other, when the rear passage is closed while the front passage is open, fine and coarse dockage will be recommingled, when said front passage is closed while the rear passage is open, the coarse dockage will be recommingled with the good grain, and when both of said passages are closed, both the fine and coarse dockage will be recommingled with the good grain.

2. The structure defined in claim 1 in which the gate-acting devices are boards applicable to and removable from working positions.

3. The combination with a vibratory shoe, of upper and lower recleaning screens carried by said shoe, the upper of said screens being of a coarser mesh than the lower of said screens, and sieve-cleaning devices applied both to the upper and lower surfaces of said upper and lower screens, said shoe being provided with an inclined bottom deck formed with discharge passages, one discharge passage receiving from the discharge end of said lower screen and the other receiving the material passed through said lower screen.

4. The combination with a vibratory sieve shoe, of upper and lower recleaning screens carried by said shoe, the lower screen at its discharge end terminating back of the discharge end of said upper screen and the bottom of said shoe having an open discharge passage located backward of the discharge end of said upper screen and forward of the discharge end of said lower screen.

5. The combination with a vibratory sieve shoe, of upper and lower recleaning screens carried by said shoe, the lower screen at its discharge end terminating back of the discharge end of said upper screen and the bottom of said shoe having an open discharge passage located backward of the discharge end of said upper screen and forward of the discharge end of said lower screen, said upper screen having coarser meshes than said lower screen.

In testimony whereof I affix my signature.

SEVERIN N. SORENSEN.